United States Patent [19]

Straus

[11] 4,347,866
[45] Sep. 7, 1982

[54] BALLCOCK ASSEMBLY

[75] Inventor: Albert E. Straus, Erie, Pa.

[73] Assignee: Hoover Universal, Inc., Ann Arbor, Mich.

[21] Appl. No.: 261,742

[22] Filed: May 8, 1981

Related U.S. Application Data

[62] Division of Ser. No. 36,399, May 7, 1979, Pat. No. 4,286,619.

[51] Int. Cl.³ .................... F16K 31/26; F16K 47/08
[52] U.S. Cl. .................................. 137/436; 138/45; 138/46; 251/121; 251/208
[58] Field of Search ............... 137/436, 437; 138/45, 138/46; 222/485, 548; 251/121, 205, 208

[56] References Cited

U.S. PATENT DOCUMENTS

| | | | |
|---|---|---|---|
| 1,643,558 | 9/1927 | Gunn | 137/437 |
| 2,382,500 | 8/1945 | Owens | 137/437 |
| 2,409,890 | 10/1946 | Owens | 137/437 |
| 3,344,894 | 10/1967 | Kenworthy | 251/208 |

FOREIGN PATENT DOCUMENTS 904715 7/1972 Canada ........................ 137/437

Primary Examiner—George L. Walton
Attorney, Agent, or Firm—Olsen and Stephenson

[57] ABSTRACT

A ballcock assembly adaptable for use in a variety of sizes and types of toilet flush tanks. The ballcock assembly comprises a standpipe having a ballcock valve at its upper end and having an adjustable height mechanism for varying the height of the ballcock valve in a toilet flush tank. The ballcock valve is a positive closing valve which includes a valve element movable to an open position against the pressure of the supply water by means of a valve actuating member that is pivotally connected to the standpipe and that is also connected to a float unit which surrounds the standpipe unit. The standpipe includes a hush tube which conveys water to the bottom of the toilet flush tank. The hush tube carries water distribution control means which functions to control the proportion of water delivered to the toilet flush tank and to the bowl refill.

7 Claims, 14 Drawing Figures

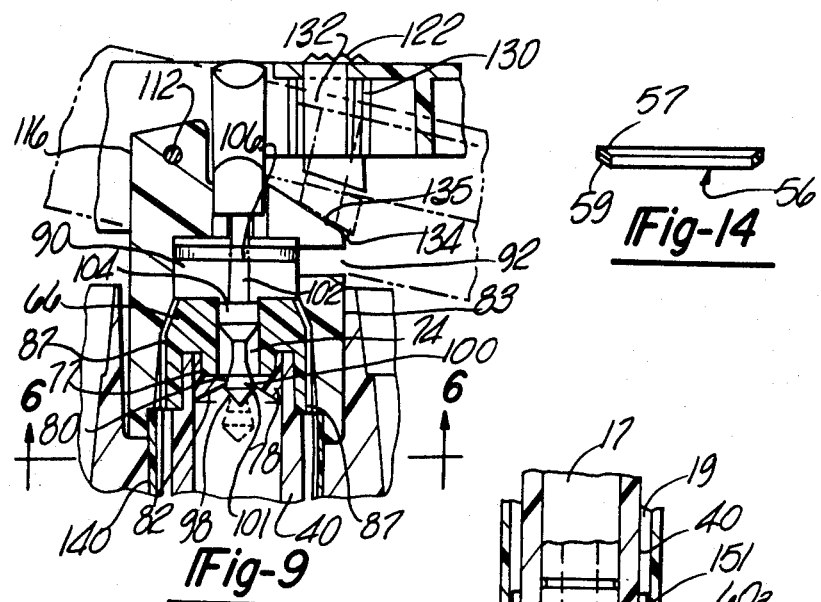
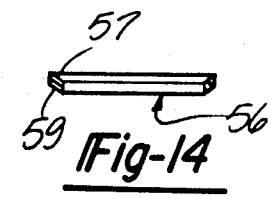
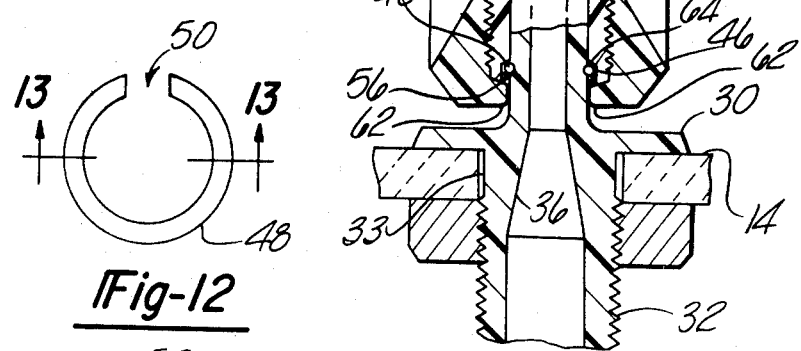
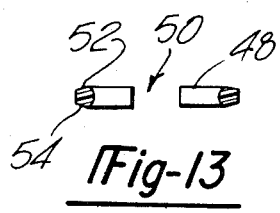
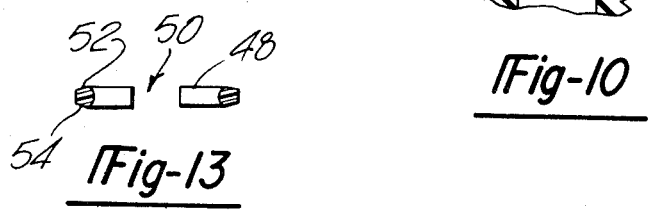

BALLCOCK ASSEMBLY

CROSS REFERENCE TO RELATED APPLICATION

This application is a division of application Ser. No. 036,399, filed May 7, 1979, now U.S. Pat. No. 4,286,619.

BACKGROUND OF THE INVENTION

The present invention relates to a ballcock assembly. Ballcock assemblies function to control the delivery of water to a toilet flush tank to maintain a predetermined level of water in the toilet flush tank. Illustrative of these ballcock assemblies of which applicant is aware are the following patents:

| U.S. PAT. NO. | PATENTED |
| --- | --- |
| 921,131 | May 11, 1909 |
| 1,643,558 | September 27, 1927 |
| 2,911,000 | November 3, 1959 |
| 3,194,258 | July 13, 1965 |
| 3,554,219 | January 12, 1971 |
| 3,693,649 | September 26, 1972 |
| 3,797,518 | March 19, 1974 |
| 3,982,556 | September 28, 1976 |

Ballcock valve assemblies which function to maintain a predetermined level of water in a toilet flush tank are usually designed to accommodate a particular type and size of toilet flush tank and therefore cannot readily be installed in a variety of toilet flush tanks. General purpose ballcocks designed to be installed in a variety of toilet flush tanks tend to be expensive and complicated.

Some ballcock valve assemblies consist of a standpipe having a positive action ballcock valve wherein the valve opens against the water pressure in the supply pipe. One advantage of this type of valve is that the water pressure aids in closing the valve since its closing action corresponds with the flow of water through the valve. When the water pressure is high, however, use of a positive action ballcock valve is feasible only if the lever arm which opens the valve is sufficiently long enough to overcome the water pressure in the supply line. The use of a long lever arm usually dictates the use of a float attached to the end of the lever arm to provide an adequate counterweight to open the valve against the pressure of the supply water. An example of such a ballcock is illustrated in U.S. Patent No. 921,131. Such a ballcock valve assembly is cumbersome causing installation and adjustment to be unduly difficult. Moreover, if such a ballcock is sold as an aftermarket item, extra costs relating to packaging and distribution are incurred because of the unwieldly construction of the ballcock.

Elimination of the long lever arm with an attached float in a positive action ballcock valve has resulted in a variety of mechanisms for opening a valve against the pressure of the supply water. In U.S. Pat. No. 3,982,556 there is disclosed a positive action ballcock valve that is operably connected to the flush trip mechanism so that manual operation of the trip mechanism opens the valve. Thus, a fairly sophisticated linkage must be connected between the trip mechanism and the ballcock in order to initiate operation of the ballcock valve. Consequently, this type of ballcock is not readily installed in a wide variety of toilet flush tanks.

In general, there is unavailable a low cost general purpose ballcock valve assembly adaptable to be installed in a wide variety of toilet flush tanks.

It is the general object of the present invention, therefore, to provide an improved ballcock valve assembly having a ballcock valve which opens against the pressure of the water supply and which is actuated by a float that surrounds the ballcock assembly.

It is another object of the present invention to provide a ballcock assembly having an improved throttler mechanism for controlling the rate of flow of incoming water.

It is another object of the present invention to provide a ballcock assembly having means for controlling the distribution of water between the toilet flush tank and the toilet bowl.

It is another object of the present invention to provide a ballcock assembly having an improved height adjusting mechanism.

It is another object of the present invention to provide an improved ballcock assembly having means for varying the level of water in the toilet flush tank at which the ballcock valve is actuated.

SUMMARY OF THE INVENTION

The present invention overcomes the inadequacies of the prior art in providing an improved ballcock valve assembly which is compact and adaptable to be installed in a variety of types and sizes of toilet flush tanks. The ballcock valve assembly includes a standpipe that is mounted at its lower end on the bottom wall of the toilet flush tank and which has at its upper end a ballcock valve. The standpipe has interfitted telescoping tubular members, one of which forms a shank pipe that is fixedly mounted on the bottom wall of the toilet flush tank, and the other of which forms a riser pipe that is telescopically movable on the shank pipe to vary the height of the ballcock valve in the tank. The shank pipe has circular grooves formed in its outer diameter. The bottom end of the riser pipe has a counterbore into which a snap ring is disposed. The snap ring is radially expandable and contractible around the shank pipe and is contracted into one of the grooves at a selected relative position between the shank and riser pipes to fix them in an adjusted position.

An elastomeric seal which encircles the shank pipe is positioned below the snap ring. A twist ring mounts onto and is releasably secured to the lower end of the riser pipe so that when it is tightened, it forces the seal against the snap ring squeezing the snap ring between the seal and the riser pipe causing the snap ring to contract around the shank pipe to immobilize the shank pipe and the riser pipe relative to each other.

The ballcock valve is mounted at the top of the riser pipe and includes a valve element that is movable to the opened position by its movement against the pressure of the supply water. A water distribution chamber is disposed downstream from the valve and includes discharge openings, one of which is connected to the bowl and the remaining of which are connected to a water outlet passageway formed by a hush tube that surrounds the riser pipe and the shank pipe. Inwardly projecting rib portions on the hush tube are movable when the hush tube is rotated to positions blocking at least portions of the discharge openings that communicate with the hush tube. Consequently, the proportion of the flow of water discharged from the water distribution chamber to the toilet bowl and the hush tube can be selectively controlled to meet the particular capacity requirements of the toilet flush tank and the toilet bowl.

The valve element is actuated between its opened and closed positions by a valve actuating member that is pivotally mounted at the top of the standpipe. The valve actuating member is connected to a float unit that surrounds the standpipe by a connector arm which includes a plurality of open circular recesses or sockets into which cylindrical pin members on the valve actuating member and the float can be snap fitted. The connector arm therefore enables the level of water in the toilet flush tank to be varied by varying the effective distance between the float unit and the valve actuating member.

A throttler mechanism is provided for controlling the effective opening of the ballcock valve to thereby control the rate of flow of water through the valve. The throttler mechanism includes a throttler member that is adjustably mounted on the valve actuating member to selected positions longitudinally of the valve actuating member and also radially of the standpipe.

The throttler member engages a stop on the standpipe to limit the downward arc movement of the valve actuating member in opening the ballcock valve. The adjusted position of the throttler member determines the pivotal position at which the opening movement of the valve actuating member is terminated to thus establish a preselected rate of flow of water through the valve.

BRIEF DESCRIPTION OF THE DRAWING

Further objects, features and advantages of the present invention will become apparent from a consideration of the following description when taken in connection with the appended claims and the accompanying drawing in which:

FIG. 4 is a plan sectional view of the ballcock assembly taken substantially from line 4—4 in FIG. 3;

FIG. 9 is an enlarged fragmentary sectional view of the ballcock valve of the ballcock assembly shown in FIG. 3;

FIG. 10 is an enlarged fragmentary view of the lower portion of the ballcock assembly shown in FIG. 3 with portions broken away for clarity;

FIG. 11 is a side elevational view of the ballcock assembly taken substantially from line 11—11 in FIG. 2;

FIG. 12 is a plan view of a snap retaining ring which forms a component of the ballcock assembly;

FIG. 13 is a sectional elevational view of the snap retaining ring taken substantially from line 13—13 in FIG. 12; and FIG. 14 is a sectional view of an elastomeric seal which forms a component of the ballcock assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
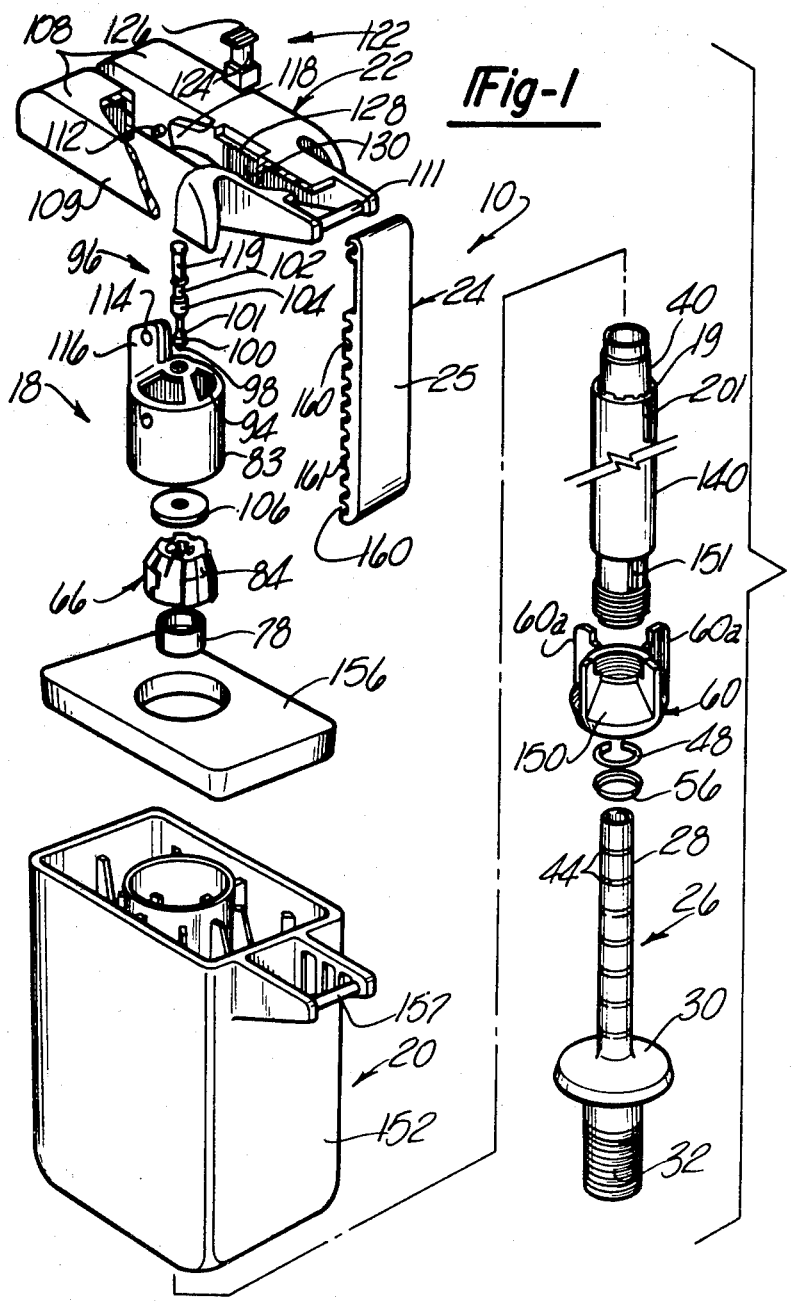
FIG. 1 is an exploded perspective view of the ballcock assembly of the present invention.
Figure 3:
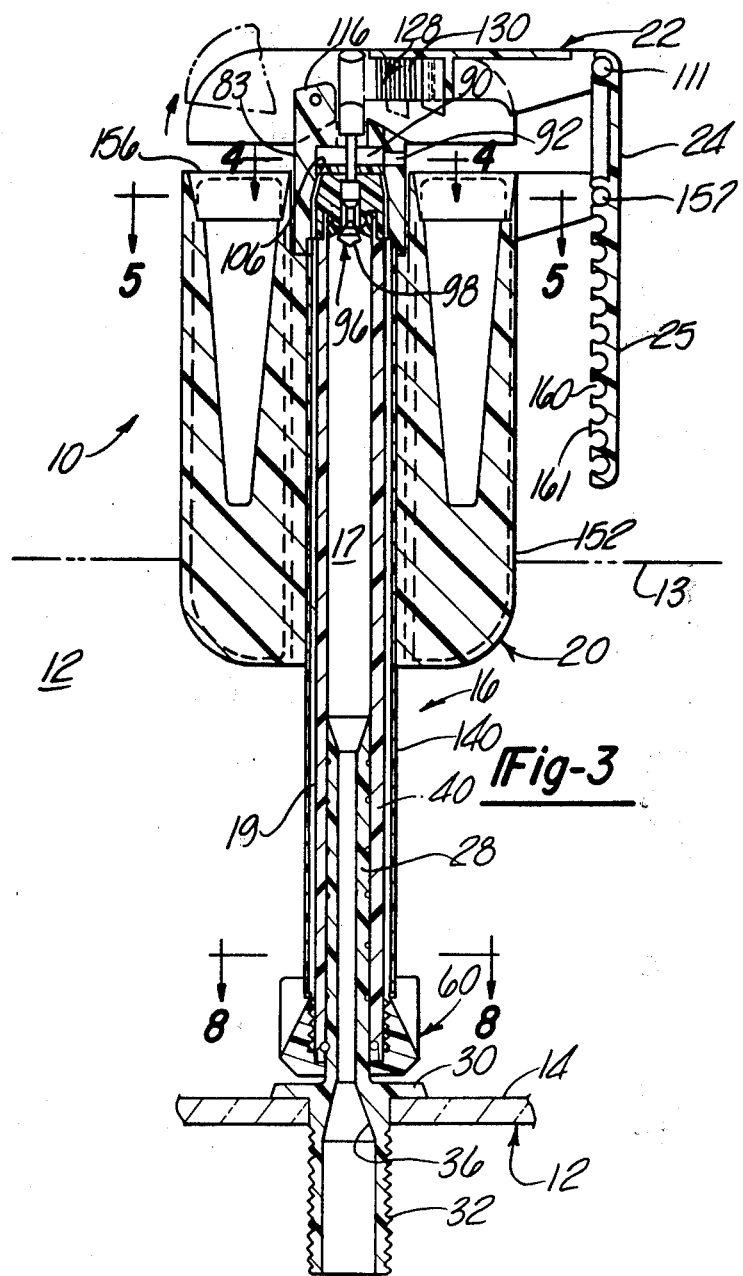
FIG. 3 is an elevational view of the ballcock assembly taken substantially from lines 3—3 in FIG. 3.

Referring to the drawing, the ballcock assembly of this invention, indicated generally at 10, is shown in exploded form in FIG. 1 and is shown in FIG. 3 mounted on a bottom wall 14 in a toilet flush tank 12. The ballcock assembly 10, when mounted on the bottom wall 14 and connected to a pressurized water supply (not shown), functions to automatically maintain a predetermined level of water in the tank 12 such as the level indicated at 13. The ballcock assembly 10 is fabricated from plastic components which are easily and inexpensively formed and which exhibit the required durability in service. The ballcock assembly 10 includes a standpipe 16 that is mounted on the wall 14, a ballcock valve 18 located at the upper end of the standpipe 16, a float unit 20 surrounding the standpipe 16 for vertical movement therealong, a valve actuating member 22 pivotally connected to the standpipe 16 and a connector arm 24 connecting the float unit 20 to the valve actuating member 22.

Figure 5:
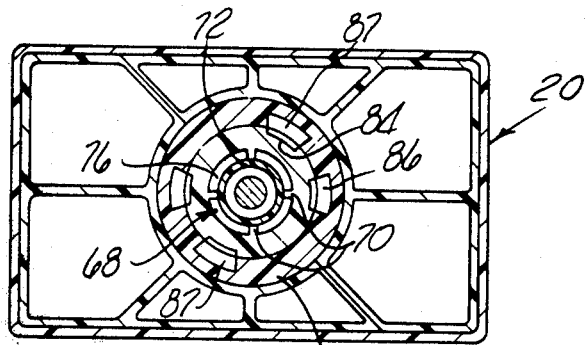
FIG. 5 is a plan sectional view of the ballcock assembly taken substantially from line 5—5 of FIG. 3.
Figures 6, 7:
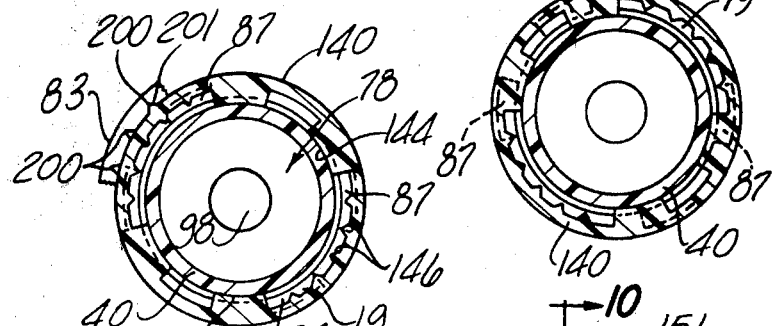
FIG. 6 is a sectional view of the standpipe of the ballcock assembly taken substantially from line 6—6 in FIG. 9.
FIG. 7 is a sectional view of the standpipe like FIG. 6 but showing the components of the standpipe in a different relative orientation.
Figure 8:
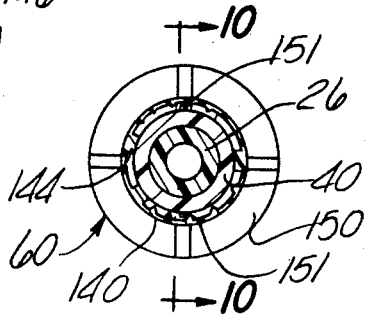
FIG. 8 is a sectional view of the standpipe of the ballcock assembly taken substantially from line 8—8 in FIG. 3.

The standpipe 16 includes a water inlet passageway 17 through which incoming water flows to the ballcock valve 18 and a water discharge passageway 19, as seen in FIGS. 5 and 6, through which water is conveyed to the toilet flush tank 12.

The standpipe 16, as seen in FIGS. 1 and 10, includes a first tubular member or shank pipe 26 having a neck extension 28, a mounting flange 30 which projects radially beyond the neck extension 28 and a threaded connecting section 32 extending below the mounting flange 30. The shank pipe 26 mounts on the bottom wall 14 and is supported by the mounting flange 30. The threaded connecting section 32 extends through an opening 33 in the bottom wall 14 and receives a nut 34 which when tightened clamps the shank pipe 26 to the bottom wall 14 in a stationary position. The bottom of the shank pipe 26 is connected to a water supply means (not shown) for directing incoming water to the ballcock valve 18. The inner passageway of the shank pipe 28 includes tapered wall portions 36 and 38 located at opposite ends of the shank pipe 26 to smooth the incoming flow of water.

The standpipe 16 also includes a second tubular member or riser pipe 40 which telescopically interfits with the shank pipe 26. The inner diameter of the riser pipe 40 is slightly larger than the outer diameter of the neck extension 28 enabling the slidable telescopic movement of the riser pipe 40 on the stationary neck extension 28. The ballcock valve 18 is mounted on the riser pipe 40 at its upper end. Since the riser pipe 40 is telescopically movable relative to the shank pipe 26, the vertical height of the ballcock valve 18 in the toilet flush tank 12 can be varied.

The neck extension 28 has longitudinally spaced apart ring receiving grooves 44 formed in its outer surface. The lower end of the riser pipe 40 has an internal cavity or counterbore 46 into which a circular snap retaining ring 48 is disposed for maintaining the riser pipe 40 and the shank pipe 26 in an adjusted fixed position. The snap retaining ring 48 is discontinuous being provided with an opening 50 enabling the ring 48 to be radially expanded and contracted. As seen in FIG. 13, the snap ring 48 has inclined upper and lower surfaces 52 and 54 that converge in directions extending radially away from the ring 48. When expanded, the snap ring 48 is slidable along the neck extension 28 by longitudinally moving the riser pipe 40 relative to the shank pipe 26 and is positionable in a selected groove 44 so that when it is contracted it will clampingly encircle the extension 28 to immobilize the riser 40 relative to the shank pipe 26.

An elastomeric seal or gasket member 56 having an inside diameter slightly larger than the outside diameter of the neck extension 28 and an outside diameter slightly smaller than the inside diameter of the counterbore 46 is disposed on the neck extension 28. The snap retaining ring 48 is positioned between the gasket member 56 and an inclined shoulder 64 formed at the upper end of the counterbore 46. The seal 56 includes a tapered or inclined upper surface 57 that inclines radially inwardly and downwardly toward its similarly inclined bottom surface 59, which is generally parallel with the upper surface 57, as seen in FIG. 14.

A twist ring 60 is threadably mounted on the riser pipe 40 at its lower end and is provided with a central bore through which the neck extension 28 extends. The twist ring 60 has an inwardly projecting flange portion 62 which overlies the cavity 46 and engages the elastomeric seal 56 when the ring 60 is secured to the riser pipe 40. The snap ring 48 slips onto the neck extension 28 and moves freely therealong when it is expanded. The snap retaining ring 48 is disposed in the counterbore 46 and is positioned between the inclined shoulder 64 which is tapered inwardly and upwardly toward the top of the standpipe 16. With the snap retaining ring 48 and the gasket or seal 56 held in the counterbore 46 by the flange portion 62 of the loosened twist ring 60, the riser pipe 40 is freely movable on the shank pipe 26 to selectively adjust the height of the ballcock valve 18. When the snap retaining ring 48 is positioned in alignment with a selected groove 44 to establish the desired height of the ballcock valve 18, the twist ring 60 is tightened causing the flange 62 to bear axially against the seal 56 to apply axial forces against the flat bottom 59 of the seal 56. These axial forces on the seal 56 are transferred to the snap retaining ring and by virtue of the inclined surfaces 52 and 54 on the snap retaining ring 48, the inclined shoulder 64 in the counterbore 46 and the inclined surface 57 on the seal 56, the snap retaining ring 48 is compressed inwardly into the groove 44. The contraction of the ring 48 draws it into the groove 44 whose depth is sufficiently shallow so that the ring 48 projects beyond the groove 44 in an interfering relation with the shoulder 64 and the seal 56. This interfering relationship prevents relative axial movement between the riser pipe 40 and the shank pipe 26. The compression of the seal 56 urges it radially against both the riser pipe 40 and the shank pipe 26 to establish a water tight seal between the riser pipe 40 and the shank pipe 26. Although the twist ring 60 is shown threadably mounted on the riser pipe 40, other forms of securing the twist ring on the pipe 40 can be used. For instance, a quick release "bayonet" construction can be used wherein less than a full turn of the twist ring 60 will either release or secure the twist ring 60 on the riser pipe 40.

The ballcock valve 18, as seen in FIGS. 1, 5 and 9, includes a riser cap 66 which forms a valve body and which is mounted on the upper end of the riser pipe 40.

The riser cap 66 has a central bore 68 aligned with the water inlet passageway 17 in the riser pipe 40. Upright fin members 70 are formed on the riser cap 66 and extend radially inwardly into the bore 68 terminating at locations in which their inner ends 72 define a circular guide passageway 74. The spaces between the fin members 70 define passageways 76 through which the incoming water flows. The fins 70 also extend downwardly into the riser pipe 40 to provide a mounting base 77 for a valve seat 78. Although the riser pipe 40, the riser cap 66 and the valve seat 78 are shown as separate components, it is contemplated that they can be formed integrally such as by being molded into a singlet unit. The valve seat 78 includes a central orifice or port 80 that is bordered by an inclined wall 82 which extends upwardly from its periphery toward the orifice 80. The riser cap 66 is assembled in a housing 83 and is secured there by a "bayonet" fitting. The riser cap 66 is positioned to partially fill the housing 83 thereby forming a water distribution chamber 90 between the upper end of the riser cap 66 and the upper end of the housing 83. Four slots 84 are formed vertically in the outer surface of the riser cap 66 and corresponding vertical slots 86 are formed in the inner surface of the housing 83. When the riser cap 66 is locked in place in the housing, the slots 84 align with the slots 86 to define four circumferentially spaced discharge ports or openings 87. The discharge ports 87 open the chamber 90 to the water outlet passageway 19 whereby water can be conveyed to the flush tank 12. A second discharge outlet or port 92, as seen in FIGS. 4 and 9, is formed opening the water distribution chamber 90 to the toilet bowl for refill. Antisiphon vent openings 94 are formed through the top of the housing 83 to communicate with the water distribution chamber 90 to inhibit back siphonage of water.

The ballcock valve 18 also includes a valve element 96 having a conical head 98 facing upstream in the passageway 17 for vectoring the incoming flow of water and to reduce the force required to open the valve 18. A radially inwardly tapered elastomeric seal 100 is positioned in a circular groove 101 formed at a position slightly upstream of the conical head 98 and seats against the portion of the valve seat 78 surrounding the orifice 80 to close the ballcock valve 18. Accordingly, when the ballcock valve 18 is opened, the valve element 96 is moved upstream against the incoming flow of water with the head 98 being moved against the water pressure. When the ballcock valve 18, which is a positive action valve, is closed, the valve element 96 is moved downstream along with the flow of water so that the pressure in the riser pipe 40 aids in seating the seal 100 against the seat 78.

The valve element 96 further includes a valve stem 102 which has an enlarged guide portion 104 that is disposed in the guide passageway 74. The guide portion 104 engages the ends 72 of the fins 70 to provide for only vertical guided movement of the valve element 96. A vacuum breaker or rubber disk 106 is carried by the stem 102 and is movable longitudinally with respect thereto. The vacuum breaker 106 is positioned in the water distribution chamber 90 and when the valve 18 is opened the incoming water forces the vacuum breaker 106 upwardly against the upper portions of the chamber 90 to close off the antisiphon vents 94. When the valve 18 is closed, the vacuum breaker 106 drops downwardly against the top of the riser cap 66. Should the valve 18 open and a vacuum exist in the riser pipe 40, the vacuum breaker 106 closes the bore 68 preventing back siphonage of the water from the tank.

Figure 2:
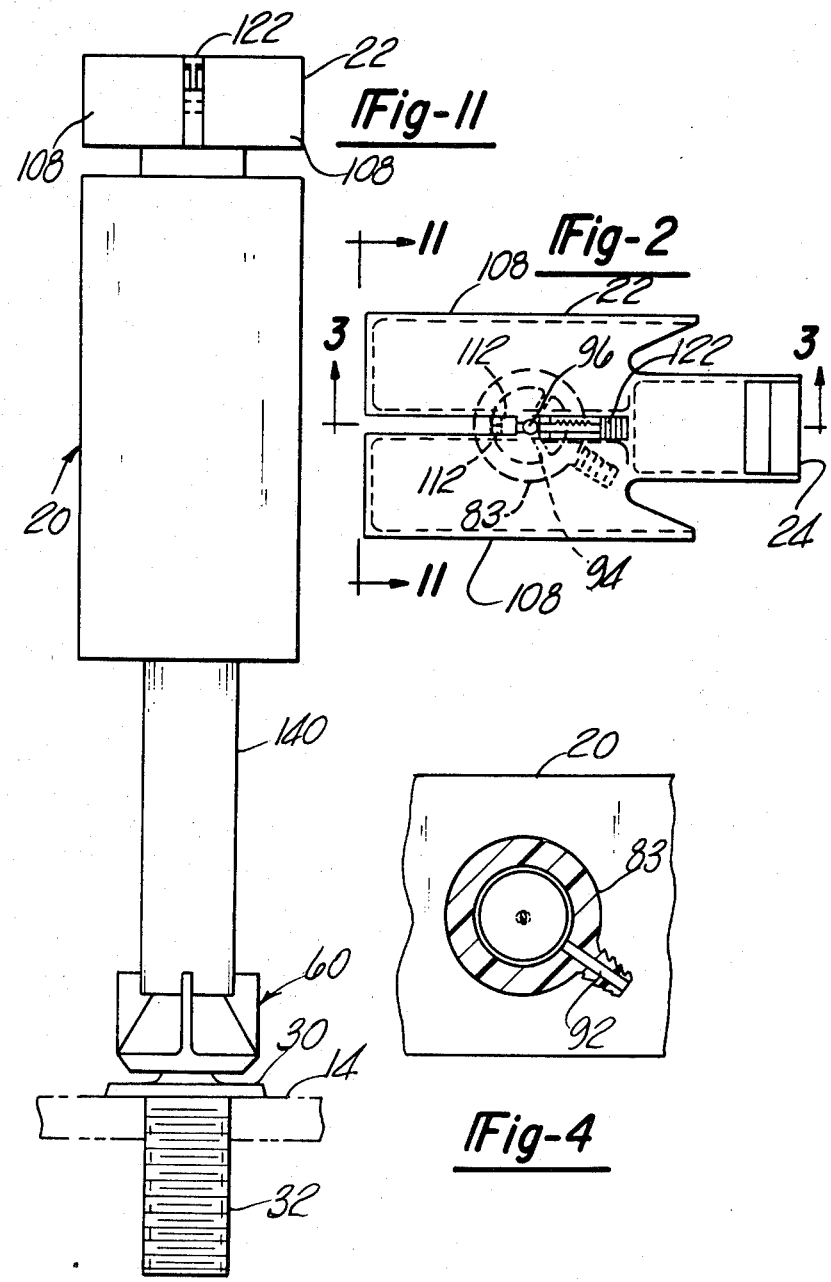
FIG. 2 is a top plan view of the ballcock assembly.

The valve actuating member 22 is formed of a unitary plastic construction which includes a pair of parallel arm members 108 positioned in a side by side relationship and connected at one end by a horizontally extending cylindrical pin 111. The construction of each arm member is essentially identical with the valve actuating member 22 being essentially symmetrical about the line 3—3 in FIG. 2. Since the valve actuating member 22 is formed of resilient plastic, the arm members 107 are movable toward and away from each other being biased toward their parallel relationship. The arm members 108 have generally flat upper surfaces with downwardly extending skirts 109 to form a guard inhibiting entry of foreign matter into the antisiphon vent openings 94.

Opposed pivot pins 112 (one shown in FIG. 1) are formed on the arm members 108 facing each other. The pivot pins 112 are releasably inserted into a horizontal opening 114 formed on a flange 116 that extends upwardly from the housing 83. Separation of the arm members 108 displaces the pins 112. After the pins 112 are aligned with the hole 114, the arm members 108 are released and their resiliency moves the pivot pins 112 into the opening 114 thereby providing for the pivotal mounting of the valve actuating member 22 on the standpipe 16. It can thus be appreciated that assembly and disassembly of the valve actuating member 22 on the standpipe 16 is easily achieved.

Positioned inwardly of the pins 112 are projecting lug members 118. Like the pins 112, the lug members 118 project inwardly toward each other from the arm members 108. The lug members 118 releasably fit into corresponding recesses on sockets 119 on the valve stem 102 providing for the vertical movement of the valve element 96 when the valve actuating member 24 is pivoted in an arc on the standpipe 16. As can be seen in FIG. 3, the distance on the valve actuating member 22 between its point of connection to the flange 116 and the point at which the valve element 96 is connected to the member 22 is significantly less than the distance between the valve element 96 and the pin 111 which connects to the float unit 20. Thus, a mechanical advantage is realized with the long lever arm between the valve element 96 and the pin 111.

The upward arc movement of the valve actuating member 22 closes the valve 18 and is limited by the tapered seal 100 when it engages the valve seat 78. The downward arc movement of the valve actuating member 22 opens the valve 18 and terminates when it engages a stop 135 on the housing 83. A throttling mechanism carried by the valve actuating member 22 is operable to adjust the pivotal position at which the downward movement of the valve actuating member 22 is terminated to vary the effective opening of the valve 18. The throttler mechanism includes a throttler member 122 having an I-beam configuration and includes an upright body portion 124 from which vertically spaced leg portions 126 transversely extend. The arm members 108 have mounting ledges 128 straddled by the transversely extending leg portions 126 to mount the throttler member 122 thereon. Consequently, the throttler member 122 is movable to longitudinal positions with respect to the arm members 108 and also movable radially with respect to the upright standpipe 16. Vertical ridges 130 are formed on one of the mounting ledges 128 and corresponding vertical ridges 132 are formed on the corresponding face of the upright body portion 124 of the throttler member 122. Adjacent vertical ridges 130 and 132 define spaces so that the ridges on the ledge 123 are positioned in the recesses formed by the ridges 132 in the throttler member 122. Thus, the adjusted longitudinal position of the throttler member 122 is maintained. The throttler member 122 engages a stop surface 135 on the housing 83 terminating the downward movement of the valve actuating member 22 establishing a predetermined effective opening of the valve 18. Varying the adjusted position of the throttler member 122 thereby varies the effective opening of the valve 18 to control the rate of flow of water through the valve 18. The throttler member 122 has an inclined surface 134 for engaging the inclined stop surface 135 on the housing 83 to provide an adequate support when the throttler member 122 engages the housing 83.

A hush tube 140 surrounds the riser pipe 40 and together therewith defines the water outlet passageway 19 which is in communication with the discharge openings 87. The hush tube 140 includes primary rib portions 144 that project radially inwardly into the passageway 19 and engage the outer surface of the riser pipe 40 to center the hush tube 140 with respect to the riser pipe 40. The primary rib portions or members 144 are circumferentially spaced to correspond with the circumferential spacing of the discharge ports 87. The hush tube 140 is rotatably mounted in the housing 83 so that it abuts against the riser cap 66 and the housing 83. The rib members 144 which extend the entire length of the hush tube also abut against the cap 66 and the housing 83 so that when the hush tube 140 is rotated the rib members 144 are movable to positions blocking the discharge openings 87 to restrict their effective opening. The rib members 144 thus form a flow restrictor means for the standpipe 16. As seen in FIG. 6, the primary rib members 144 are positioned so that the discharge openings 87 are completely unobstructed. In FIG. 7, the hush tube 140 has been rotated counterclockwise about 30° so that the rib members 144 block approximately fifty percent of the opening of each discharge opening 87. In this member, the proportion of water flowing from the distribution chamber 90 to the toilet flushing tank 12 through the water outlet 19 is restricted. Restriction of the discharge openings 87 increases the flow of water through the discharge opening 92 and to the toilet bowl. Thus, the flow restrictor means enables the proportion of water delivered to the tank 12 and the bowl to be varied.

The twist ring 60 is provided with vertical fins 60a which engage the lower end of the hush tube 140 and hold it in the housing 83 to prevent the longitudinal movement of the hush tube 140 relative to the riser pipe 40. The twist ring 60 is also provided with inclined water deflecting surfaces 150 off which the water issuing from the water discharge passageway 19 is deflected to reduce noise attributed to the flowing water.

The hush tube 140 is, as seen in FIG. 6, also provided with secondary rib members 146 which are circumferentially spaced along the inner surface of the hush tube between the primary rib members 144 and which also extend the entire length of the hush tube 140. The secondary rib members 146 extend only partially radially inwardly toward the riser pipe 40 and do not engage it. A pair of locking ears 151, as seen in FIGS. 1 and 10, are mounted on the riser pipe 40 at diametrically opposed positions. The locking ears 151 are engageable with the secondary rib members 146 to inhibit the rotation of the hush tube 140. Rotation of the hush tube 140 is achieved by manually overcoming the resistance between the locking ears 151 and the secondary rib members 146. Thus, the adjusted position of the hush tube 140 and hence the relative positions of the rib members 144 relative to the discharge openings are maintained. The float unit 20 includes a hollow ballast container 152 having a central opening through which the standpipe 16 extends so that the float unit 20 surrounds the standpipe 16. A cap 156 seals the container 152 which holds sand or similar ballast and which acts as a counterweight to open the valve 18 against the pressure of the water. The container 152 has a horizontal cylindrical pin 157 that is vertically aligned with the horizontal cylindrical pin 111 on the valve actuating member 22.

A connecting arm 24 is snap fitted onto the cylindrical pins 157 and 111 and together with valve actuating member 22 forms a linkage transmitting the vertical movement of the float unit 20 to the valve actuating member 22. The connecting arm 24 comprises a vertical base 25 having a plurality of vertically spaced apart open sockets 160. The open sockets 160 each have a C-shape and are formed by resilient projections 161 on the base 25 enabling the snap fit of the cylindrical pin members 111 and 157 to be achieved. The connector arm 24 enables the vertical height of the float unit 20 in the tank 12 to be varied to thereby vary the water level at which the valve 18 is actuated. Incorporation of the connector arm 24 in the ballcock 10 enables the level of water in the tank to be varied while still permitting the full flow of water through the valve 18 during the flush cycle.

In operation, assume that the ballcock assembly 10 is mounted in the tank 12, as shown in FIG. 3, and that the vertical height of the valve 18 is to be adjusted. The twist ring 60 would be loosened thereby relieving axial forces on the seal 56 and the snap retaining ring 48. Expansion of the ring 48 partially from the groove 44 would enable it to be completely displaced from the groove 44 upon movement of the riser pipe 40. The riser pipe 40 would then be telescoped relative to the neck extension 28 carrying with it the ring 48, the seal 56 and the twist ring 60 until the snap ring 48 was aligned with and partially inserted into another groove 44 at a selected height. The twist ring 60 then would be tightened causing the flange 62 to bear against the seal 56 which in turn bears against the ring 48 to contract the ring 48 into the groove 44. A water tight seal and the fixed position of the riser pipe 40 relative to the shank pipe 26 are thus established.

When the toilet is flushed, the water in the water flushing tank 12 recedes causing the float unit 20 to move downwardly under gravity as the buoyancy supporting the float unit 20 is relieved. The downward vertical movement of the float 20 is transferred through the connector arm 24 to the valve actuating member 22 to push the valve element 96 to open the valve 18. The conical head 98 vectors the incoming water reducing the force required to open the valve 18. Incoming water flowing in the riser pipe 40 passes through the passageways 76 and flows into the water distributing chamber 90 where it pushes the vacuum breaker 106 upwardly closing the vents 94. A portion of the water flows through the discharge opening 92 to the bowl to refill it. The rest of the water flows from the chamber 90 through the discharge openings 87 and into the water outlet passageway 19. The proportion of water delivered to the openings 87 and 92 is determined by the rotated position of the hush tube 140 which restricts the effective opening of discharge openings 87.

As the water level rises in the tank 12, the ballast container 152 becomes buoyant and as it moves vertically upward the tapered seal 100 is seated against the valve seat 78 closing the valve 18. The force generated by the incoming water cooperates with the float unit 20 to shut the ballcock valve 18. Valve shutoff occurs at a water level determined by the distance between the locations on the connector arm 24 where the float unit 20 and the valve actuating lever arm 22 are snap fitted.

As seen in FIGS. 3 and 9, when the tank 12 is fitted to the water level 13, the ballcock valve 18 is closed with the tapered seal 100 seated against the valve seat 78. The line pressure thus acts against the valve body 96 urging it to maintain its closed position.

The construction of the valve element 96 along with the mechanical advantages provided in the float unit 20, the connector arm 24 and the valve actuating member 22 allows the orifice 80 to be larger than has heretofore been possible. The larger orifice 80 eliminates the possibility of scale or small foreign objects in the water being trapped in the orifice 80 which could prevent the complete closing of the valve 18. The vacuum breaker 106 is urged downwardly under atmospheric pressure acting through the antisiphon vents 94 to break any vacuum existing in the water outlet passageway 19.

An alternative structure for maintaining the hush tube 140 in a circumferentially adjusted position to control the rate of flow of water through the discharge ports 87 is shown in FIG. 6. Vertical circumferentially spaced upright grooves 200 are formed in the housing 83 on the inner walls defining the opening which receives the hush tube 140. A secondary or locating rib 201 is formed integral with the hush tube 140 and projects outwardly from the outer surface of the tube 140. The grooves 200 are located in selected spaced apart positions to define three effective openings of the discharge ports 87. When the locating rib 201 is disposed in one of the openings 200, a selected effective opening of the discharge ports 87 is established and maintained. Readjustment of the hush tube 140 is accomplished by manually overcoming the resistance of the locating rib 201 in its associated groove 200 and rotating the hush tube 140 to another selected position. As shown in FIG. 6, the rib 201 is positioned in the groove 200 maintaining the hush tube 140 in a position in which the discharge ports 87 are completely unobstructed by the rib portions 144.

From the above description, it can be seen that an improved ballcock assembly is provided that will function in any toilet flush tank without any post-manufactured modification for fit or installation. The ballcock assembly of this invention is economical, easy to manufacture and assemble, easy to install and adjust to meet the particular installation requirements, and performs in a manner satisfying all recognized codes and approval agencies.

It is claimed:

1. A ballcock valve assembly for controlling the supply of liquid to a liquid storage tank comprising,
   a standpipe through which liquid is conveyed to said storage tank,
   valve means on said standpipe for controlling the delivery of liquid to said tank,
   means forming a liquid distribution chamber in communication with said valve means, said chamber having at least one discharge opening through which said liquid flows from said chamber, said standpipe including an outlet tubular member in communication with said discharge opening and providing a liquid outlet flow passageway from said chamber to said tank, said tubular member including flow restrictor means for restricting said discharge opening, said flow restrictor means being operable in response to rotation of said tubular member about the longitudinal axis thereof and with respect to said discharge opening to adjust the flow of liquid from said discharge opening through said passageway.

2. The ballcock valve assembly that is defined in claim 1, wherein said flow restrictor means comprises rib portions on said tubular member, said rib portions being formed integral with said tubular member and projecting radially inwardly into said passageway, said rib portions being movable to positions blocking said discharge opening to restrict the flow of liquid therethrough.

3. The ballcock valve assembly that is defined in claim 2, wherein said chamber has a second discharge opening providing a second liquid outlet flow passageway from said chamber so that restriction of the first mentioned discharge opening varies the proportion of liquid flowing through said first and second discharge openings.

4. The ballcock valve assembly that is defined in claim 3, wherein said standpipe includes a liquid inlet tubular member disposed in and concentrically with said outlet tubular member, said rib portions engaging the outer surface of said inlet tubular member to locate said outlet tubular member concentrically with said inlet tubular member.

5. The ballcock valve assembly that is defined in claim 3, wherein said outlet tubular member has secondary rib portions, and means engageable with said secondary rib portions to inhibit rotation of said outlet tubular member so as to maintain the relative position between said flow restrictor rib portions and said discharge opening.

6. The ballcock valve assembly that is defined in claim 5, wherein said flow restrictor rib portions and said secondary rib portions extend the entire length of said outlet tubular member.

7. The ballcock valve assembly that is defined in claim 1 and further including locating means operable to maintain said outlet tubular member at a selected position relative to said at least one discharge opening establishing a selected effective opening of said at least one discharge opening.

* * * * *